United States Patent
Okada et al.

(10) Patent No.: US 7,013,728 B2
(45) Date of Patent: Mar. 21, 2006

(54) SYSTEM FOR DETECTING LEVEL OF LIQUID IN TANK

(75) Inventors: Hiroshi Okada, Gunma (JP); Masato Kumagai, Saitama (JP); Hironori Ohhashi, Gunma (JP)

(73) Assignee: Hitachi Ltd., Tokyo-to (JP)

( * ) Notice: Subject to any disclaimer, the term of this patent is extended or adjusted under 35 U.S.C. 154(b) by 0 days.

(21) Appl. No.: 10/750,972

(22) Filed: Jan. 5, 2004

(65) Prior Publication Data

US 2004/0182150 A1 Sep. 23, 2004

(30) Foreign Application Priority Data

Jan. 9, 2003 (JP) .............................. 2003-003410

(51) Int. Cl.
*G01F 23/52* (2006.01)
*G01F 23/60* (2006.01)
*G01F 23/36* (2006.01)
*G01F 23/00* (2006.01)
*G01B 21/00* (2006.01)

(52) U.S. Cl. ........................ 73/313; 340/623; 340/625; 116/227

(58) Field of Classification Search .................. 73/313, 73/314, 317; 340/623, 625; 116/227
See application file for complete search history.

(56) References Cited

U.S. PATENT DOCUMENTS 4,987,400 A * 1/1991 Fekete ......................... 338/164

FOREIGN PATENT DOCUMENTS

| CN | 2537000 Y | 2/2003 |
| DE | 36 27 109 A1 | 2/1988 |
| EP | 575971 A1 * | 12/1993 |
| JP | 64-38534 U | 3/1989 |
| JP | 2001356040 A * | 12/2001 |
| WO | 88/01046 A | 2/1988 |
| WO | 98/45673 A | 10/1998 |

* cited by examiner

*Primary Examiner*—Hezron Williams
*Assistant Examiner*—Tamiko Bellamy
(74) *Attorney, Agent, or Firm*—Sughrue Mion, PLLC (57) ABSTRACT

A system for detecting the level of liquid in a tank includes a sensor part provided to the tank and for sensing a position of the liquid level in accordance with displacement of a float, and a sensor casing arranged in the tank to be isolated from liquid and for accommodating the sensor part.

5 Claims, 9 Drawing Sheets

SYSTEM FOR DETECTING LEVEL OF LIQUID IN TANK

BACKGROUND OF THE INVENTION

The present invention relates to a system for detecting the level of liquid in a tank, which is suitably used, for example, in detecting the level of fuel accumulated or accommodated in an automotive fuel tank.

Typically, as disclosed in JP-U 64-38534, the fuel tank mounted on the vehicle such as automobile is provided with a float-type level detecting system, for example, to detect the remaining amount of fuel accumulated in the tank. The float-type level detecting system comprises a float arranged vertically movably with the level of fuel accumulated in the fuel tank and a sensor part provided to the tank and for sensing a fuel level position in accordance with displacement of the float.

The float is coupled to an arm which is rotatable with respect to the sensor part. When fuel accumulated in the fuel tank increases or decreases, the float is vertically displaced with the liquid level in the tank, rotating the arm by an angle corresponding to that displacement.

The sensor part, which is in the form of a potentiometer or the like, comprises a resistor exposedly fixedly arranged in the fuel tank and a conductive slide brush which moves on the resistor in a sliding way when the arm rotates.

When a slide-contact position between the resistor and the slide brush varies with the angle of rotation of the arm, a value of resistance of the resistor varies accordingly. In accordance with this variation, the sensor part senses a position of the float, i.e. a fuel level position, which is announced as fuel remaining amount to a driver and the like.

With the typical level detecting system, the sensor part includes a potentiometer or the like to sense displacement of the float as displacement of a fuel level position.

However, the resistor of the sensor part is exposedly disposed in the fuel tank for slide contact with the slide brush of the arm. And the resistor and the slide brush are often immersed in fuel in the fuel tank.

As a result, with years of use of the level detecting system, the resistor and the slide brush can be subject to corrosion by various constituents and the like contained in fuel or cause contact failure, raising a problem of lowering the durability and reliability of the system.

SUMMARY OF THE INVENTION

It is, therefore, an object of the present invention to provide a system for detecting the level of liquid in a tank, which allows stable detection of a liquid level position in the tank over the long term without causing anomaly, and thus contributes to enhancement in the durability and reliability of the system.

The present invention provides generally a system for detecting a level of liquid in a tank, which comprises: a float which produces a displacement with the liquid level; a sensor part provided to the tank, the sensor part sensing a position of the liquid level in accordance with the displacement of the float; and a casing arranged in the tank, the casing being isolated from the liquid, the casing accommodating the sensor part.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings wherein like reference numerals designate like parts throughout the views, a description is made about a system for detecting the level of liquid in a tank embodying the present invention. In the illustrative embodiments, the present invention is applied to a fuel remaining-amount detecting system for motor vehicles.

Referring to FIGS. 1–5, there is shown first embodiment of the present invention. A roughly box-shaped fuel tank 1 to be mounted on the vehicle such as automobile is formed as a container having a bottom face 1A, a top face 1B, and a peripheral wall, not shown, and for accumulating or accommodating fuel or liquid therein. Top face 1B of fuel tank 1 is formed with a mounting opening 1C to which a lid 2 as will be described later is attached.

Figure 2:
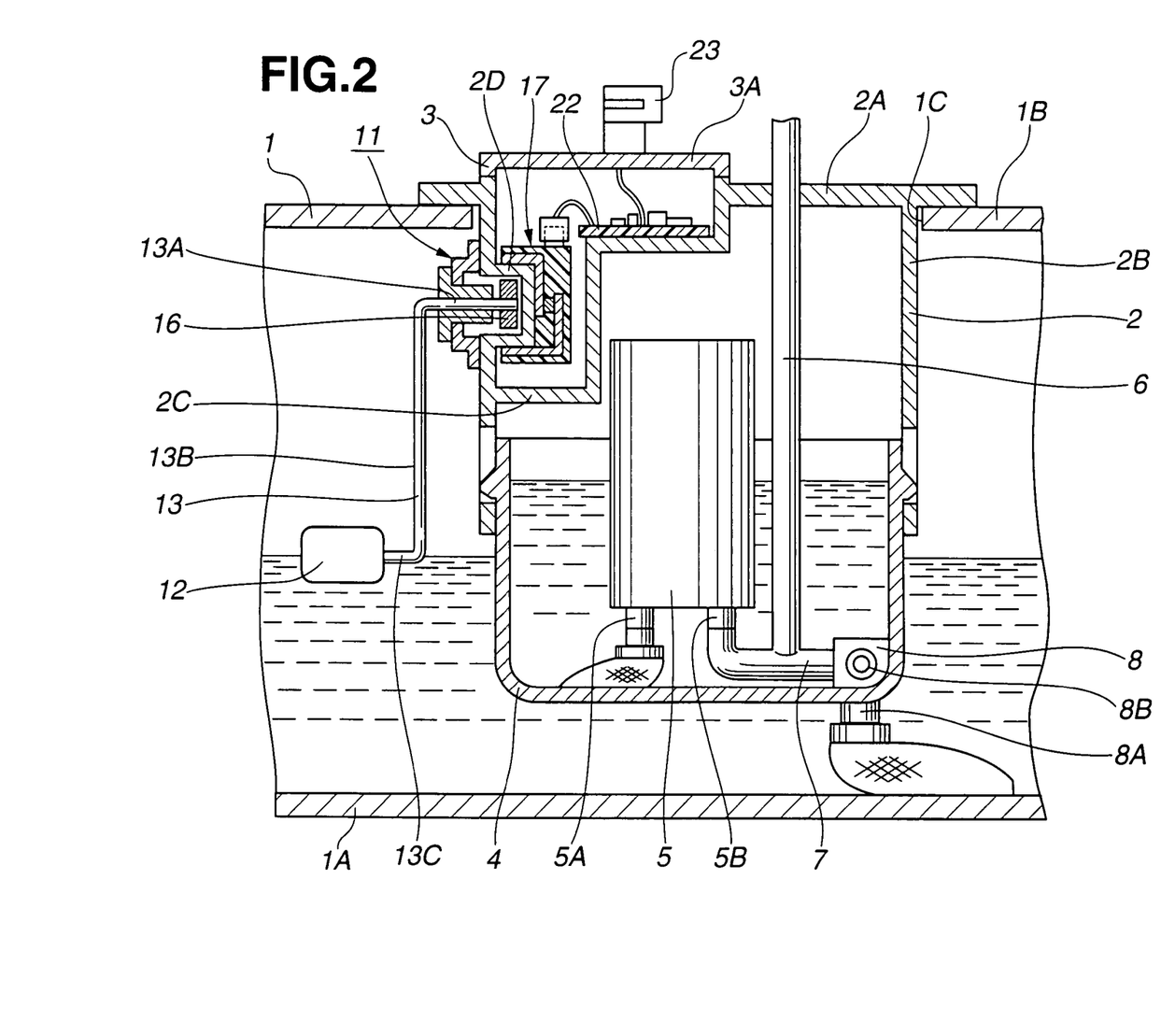
FIG. 2 is a sectional view taken along the line II—II in FIG. 1.
Figure 3:
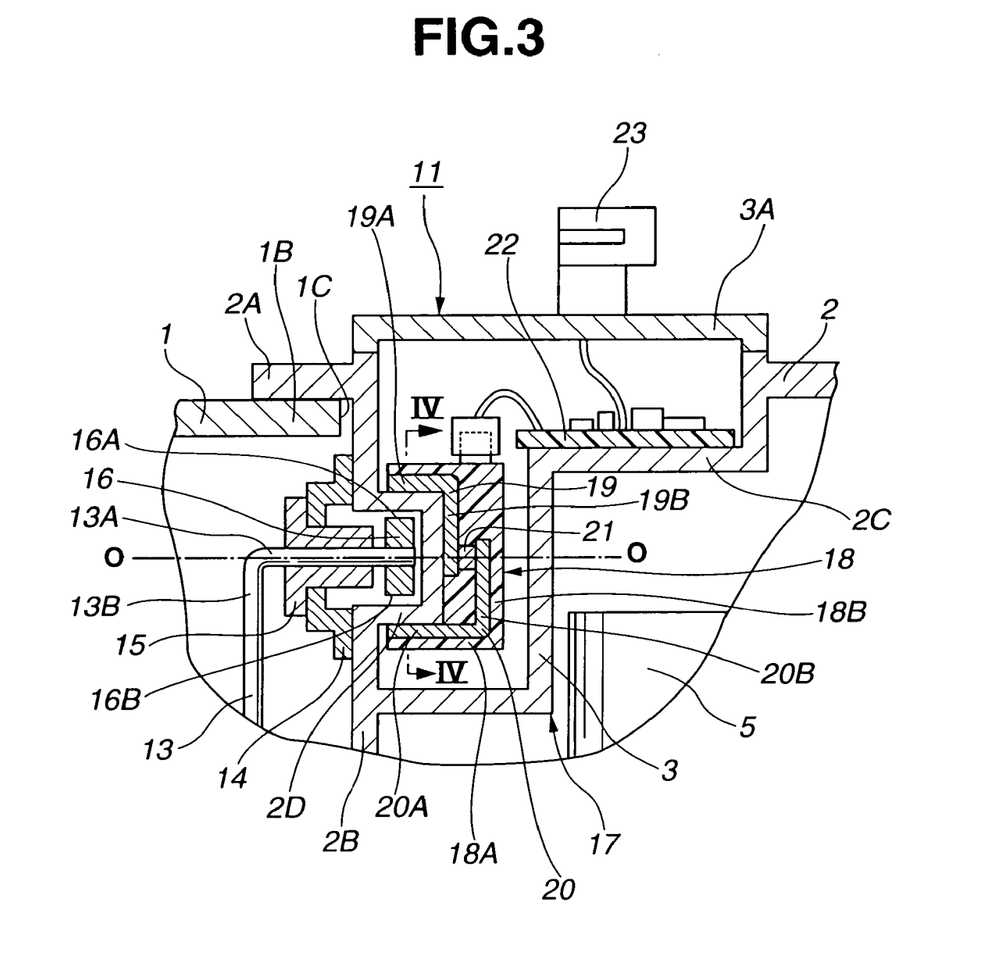
FIG. 3 is a fragmentary sectional view showing a sensor casing in FIG. 1.

Referring to FIGS. 2 and 3, lid 2 is attached to mounting opening 1C of fuel tank 1, and comprises a closing plate 2A for concealing mounting opening 1C of tank 1, a cylindrical chamber mounting portion 2B protruding from closing plate 2A into tank 1 through mounting opening 1C, and an inner partition wall 2C arranged between closing plate 2A and chamber mounting portion 2B to form a sensor casing 3 as will be described later on the inner-periphery side of chamber mounting portion 2B.

A bottomed cylindrical sensor mounting portion 2D is formed at chamber mounting portion 2B to protrude radially inward into sensor casing 3. The inner periphery of sensor mounting portion 2D opens as a bottomed concave to the outer periphery of chamber mounting portion 2B. Lid 2 is formed of a synthetic resin or the like so that the magnetic field of a magnet 16 as will be described later acts into sensor casing 3 through sensor mounting portion 2D.

Sensor casing 3 is arranged in fuel tank 1 through the use of lid 2 to accommodate rotation-angle sensor 17 as will be described later hermetically isolatedly from fuel in tank 1. By closing plate 2A, chamber mounting portion 2B, inner peripheral wall 2C, and the like of lid 2, sensor casing 3 is formed as a closed container isolated from a space of fuel tank 1. Sensor casing 3 has a top side concealed with a lid plate 3A.

Figure 1:
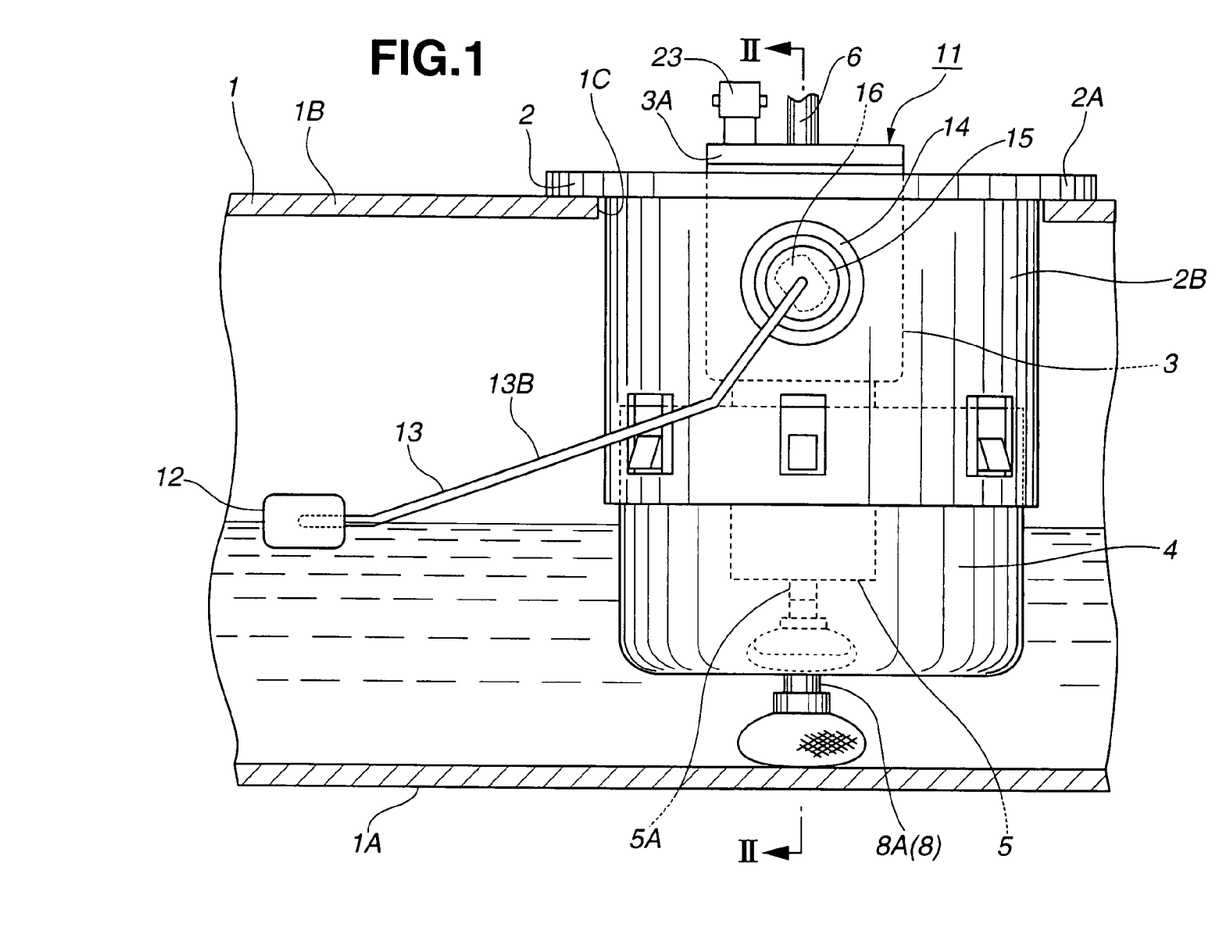
FIG. 1 is a sectional view showing a first embodiment of a system for detecting the level of liquid in a tank according to the present invention.

A bottomed cylindrical chamber 4 is arranged in fuel tank 1, and has a top side mounted to chamber mounting portion 2B of lid 2. Chamber 4 serves to always accumulate part of fuel in tank 1 so as to ensure a predetermined amount of fuel on the intake side of a fuel pump 5 as will be described later even if an inconvenience occurs such as small remaining amount of fuel in tank 1, level of fuel inclined, or the like.

Fuel pump 5 is disposed in chamber 4, and has an inlet port 5A for introducing fuel in chamber 4 and an outlet port 5B for feeding introduced fuel to a supply pipe 6 as will be described later. Fuel pump 5 serves to supply fuel to an automotive engine and the like. A filter, not shown, and the like may be arranged in chamber 4 together with fuel pump 5.

Roughly L-shaped supply pipe 6 is arranged to supply fuel in fuel tank 1 to the engine. Supply pipe 6 has a base end connected to outlet port 5B of fuel pump 5 and a front end protruding outward of fuel tank 1 through lid 2 and connected to the engine. A suction-pump pipe 7 is connected at the middle position of supply pipe 6 to supply a predetermined amount of fuel discharged from fuel pump 5 to a suction pump 8 as will be described later.

Suction pump 8 is arranged in chamber 4, and includes a jet pump or the like. Suction pump 8 has an inlet port 8A which opens to the outside of chamber 4 and an outlet port 8B which opens to the inside of chamber 4. Suction pump 8 serves to suck fuel outside chamber 4 with the aid of part of fuel discharged from fuel pump 5 and discharge it into chamber 4 through outlet port 8B.

A fuel remaining-amount detecting system 11 is arranged in fuel tank 1 to serve as a level detecting system. Fuel remaining-amount detecting system 11 comprises sensor casing 3, a float 12, an arm 13 as will be described later, magnet 16, and rotation-angle sensor 17.

Float 12 is floatably supported by arm 13, and moves vertically with the level of fuel accumulated in fuel tank 1 to rotate arm 13 accordingly.

Arm 13 is formed of an elongated rod or the like, and comprises a rotation shank 13A located at the base end, a lever 13B protruding from the front end of rotation shank 13A radially outward, and a float mounting portion 13C bent to the front end of lever 13B and mounted to float 12.

Referring to FIG. 3, an annular arm bracket 14 is mounted to chamber mounting portion 2B of lid 2 so as to close a space in sensor mounting portion 2D from the radial outside of chamber mounting portion 2B. A support cylinder 15 is engaged at the inner periphery of arm bracket 14. Rotation shank 13A of arm 13 has a base end disposed in sensor mounting portion 2D and rotatably supported by arm bracket 14 through support cylinder 15. With this, when float 12 moves vertically, arm 13 rotates about an axis O-O.

Figure 4:
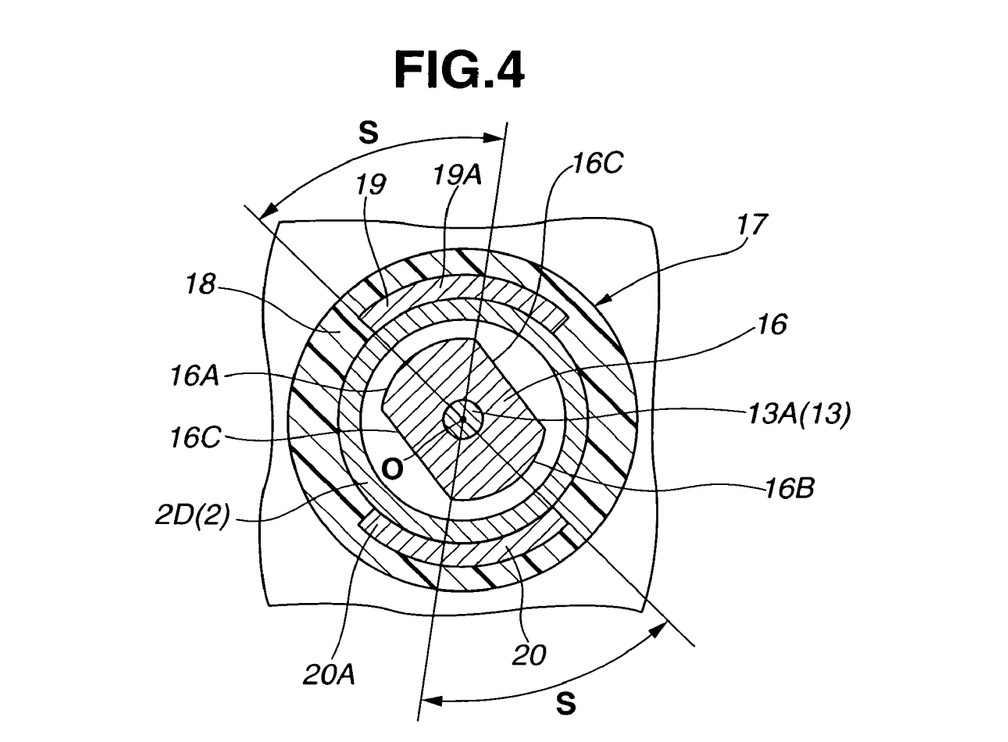
FIG. 4 is an enlarged sectional view taken along the line IV—IV in FIG. 3.

Magnet 16 is mounted to rotation shank 13A of arm 13 in a rotation locked way. Referring to FIGS. 3 and 4, magnet 16 is located outside sensor casing 3 and accommodated in sensor mounting portion 2D of lid 2. Magnet 16 rotates together with arm 13 in accordance with displacement of float 1, the angle of rotation of which is sensed by rotation-angle sensor 17 as a level position of fuel in fuel tank 1.

Magnet 16 is formed of a roughly disc-shaped magnet material or the like, and comprises at the outer periphery convex circular surfaces 16A, 16B located at both diametral ends and forming N and S poles, for example, and flat surfaces 16C located between convex circular surfaces 16A, 16B. Convex circular surfaces 16A, 16B spreads circularly, and has a predetermined angle or central angle with respect to axis O-O or center O of arm 13.

Magnetic-detection type rotation-angle sensor or sensor part 17 is accommodated in sensor casing 3 of lid 2. Referring to FIGS. 3 and 4, rotation-angle sensor 17 comprises a housing 18, yokes 19, 20, a Hall element 21, a circuit board 22 as will be described later, and the like, which are hermetically accommodated in sensor casing 3 and isolated from fuel in fuel tank 1.

Housing 18 is formed like a bottomed cylinder out of an insulating resin material or the like, and comprises a cylindrical portion 18A located in sensor casing 3 and mounted to the outer periphery of sensor mounting portion 2D of lid 2 and a bottom portion 18B arranged at an end of cylindrical portion 18A.

Yoke 19 is arranged in housing 18 to form a magnetic path. Yoke 19 is formed of a magnetic metallic material or the like, and comprises a magnet facing portion 19A spreading circularly along cylindrical portion 18A of housing 18 and an extension 19B extending radially inward from magnet facing portion 19A to the center of bottom portion 18B of housing 18. Yoke 20 is also arranged in housing 18 to form a magnetic path. In a way substantially similar to yoke 19, yoke 20 is formed of a magnetic metallic material or the like, and comprises a magnet facing portion 20A and an extension 20B.

Figure 5:
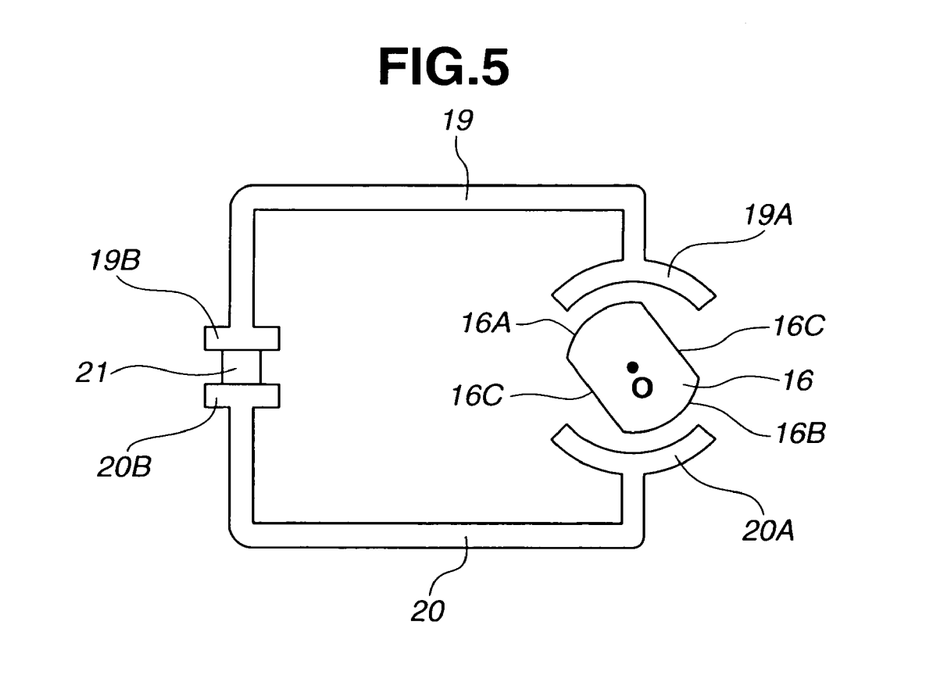
FIG. 5 is a diagram showing a magnetic circuit of a rotation-angle sensor.

Referring to FIGS. 4 and 5, magnet facing portions 19A, 20A of yokes 19, 20 are disposed to face each other across magnet 16, each spreading circularly and having a predetermined central angle. Magnet facing portion 19A faces convex circular surface 16A of magnet 16 across sensor mounting portion 2D of lid 2, whereas magnet facing portion 20A faces convex circular surface 16B across sensor mounting portion 2D.

Facing areas S of magnet facing portions 19A, 20A and convex circular surfaces 16A, 16B vary with the angle of rotation of magnet 16 (arm 13, to be more specific). As shown in FIG. 3, yokes 19, 20 are disposed to have extensions 19B, 20B overlapping one another with a given clearance to form a closed magnetic path through which the magnetic field of magnet passes.

Referring to FIG. 5, Hall element 21 is arranged in housing 18 and disposed between extensions 19B, 20B of yokes 19, 20. When arm 13 rotates, the magnetic field passing through yokes 19, 20 varies with the angle of rotation of arm 13, i.e. facing areas S of magnet 16 and yokes 19, 20. With this, Hall element 21 detects a variation in the magnetic field as that in the angle of rotation of arm 13, which is output as a signal to circuit board 22.

Circuit board 22 is mounted to the inside of sensor caring 3 and connected to Hall element 21. Circuit board 22 provides signal processing such as amplification and correction to an output signal of Hall element 21, for example, to generate a detection signal corresponding to a level position of fuel in fuel tank 1, which is output to the outside from a connector 23 provided to lid plate 3A of sensor casing 3, for example.

Next, operation of fuel remaining-amount detecting system 11 is described. When a level position of fuel accumulated in fuel tank 1 varies by refilling, consumption, and the like, float 12 is displaced with the level position, and arm 13 rotates in conjunction therewith. Then, the angle of rotation is detected by rotation-angle sensor 17, circuit board 22, and the like, which is output from connector 23 as a detection signal corresponding to the remaining amount of fuel in fuel tank 1. Thus, the fuel remaining amount can be announced to a driver and the like.

When the fuel level is inclined due to acceleration/deceleration, cornering, or the like of the vehicle, and that fuel tank 1 is roughly full of fuel and the like, the fuel level can increase up to a level position corresponding to rotation-angle sensor 17 around chamber 4.

However, components such as rotation-angle sensor 17 and circuit board 22 are hermetically accommodated in sensor casing 3 of lid 2, and are thus isolated from fuel, resulting in their sure prevention from contacting fuel.

Then, in the first embodiment, sensor casing 3 is provided to lid 2 so as to accommodate rotation-angle sensor 17 hermetically isolatedly from fuel in fuel tank 1. Thus, components constituting rotation-angle sensor 17, such as housing 18, yokes 19, 20, Hall element 21, and circuit board 22, can hermetically be accommodated in sensor casing 3, resulting in their sure isolation and protection from fuel in fuel tank 1.

With this, rotation-angle sensor 17, circuit board 22, and the like can be prevented from being subject to corrosion by various constituents and the like contained in fuel or causing operation failure, leading to stable detection of the remaining amount of fuel accumulated in fuel tank 1 over the long term. This allows extension of the life of fuel remaining-amount detecting system 11, leading to enhancement in durability and reliability thereof.

In the first embodiment, magnet 16 is provided to float 12 through arm 13 so as to sense the angle of rotation of magnet 16 by magnetic-detection type rotation-angle sensor 17. Thus, when float 12 is displaced with the level of fuel in fuel tank 1, smooth rotation of magnet 16 can be obtained in accordance with this displacement by virtue of arm 13.

And even with arm 13 and rotation-angle sensor 17 intercepted by sensor casing 3, rotation-angle sensor 17 can sense the angle of rotation of magnet 16 as a level position in fuel tank 1 based on a variation in the magnetic field and the like.

Therefore, displacement of float 12 can stably be sensed by rotation-angle sensor 17 in a non-contact way without need of arranging a seal or the like between rotation-angle sensor 17 and magnet 16, resulting in easy achievement of closed-type fuel remaining-amount detecting system 11.

Figure 6:
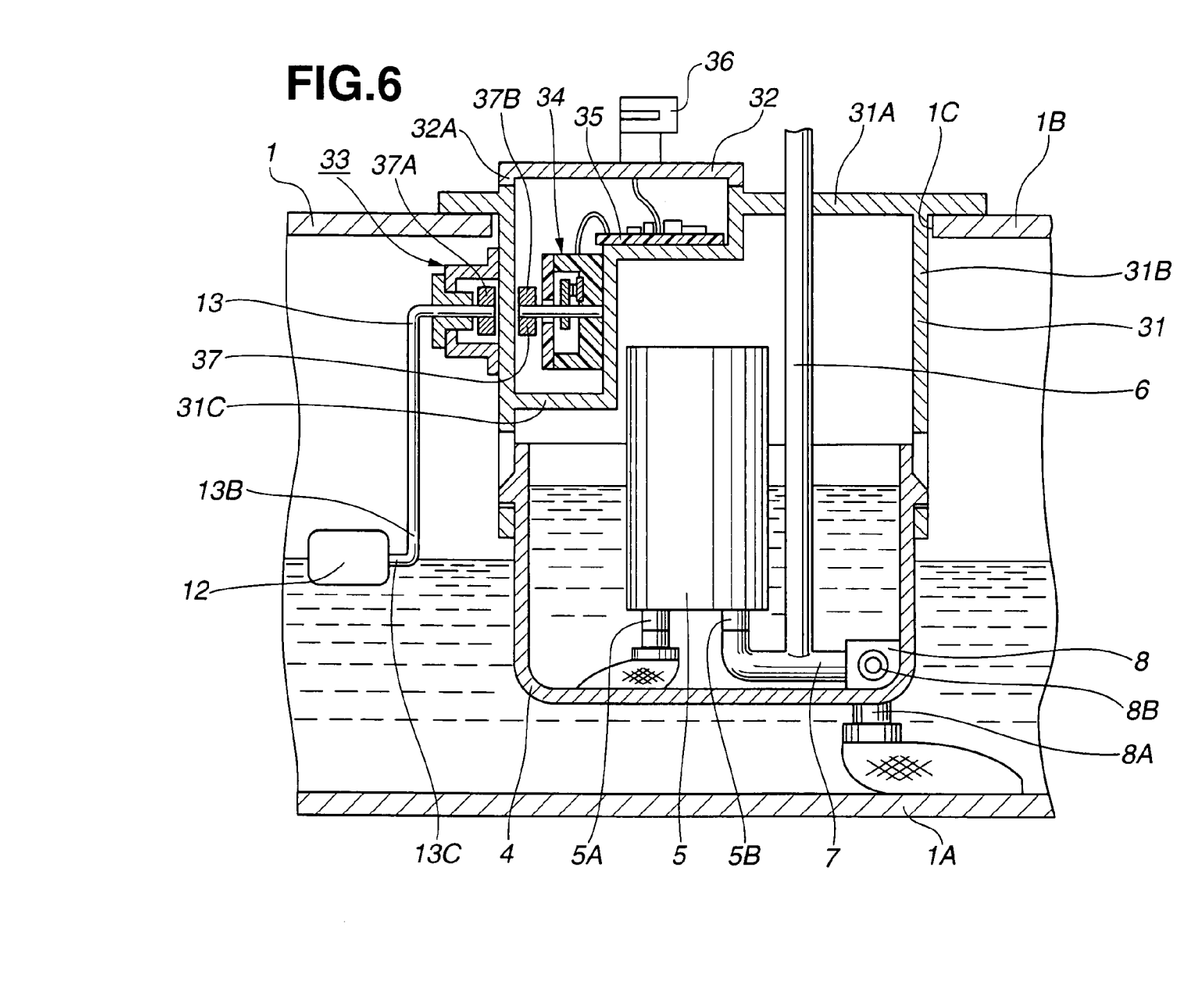
FIG. 6 is a view similar to FIG. 2, showing a second embodiment of the present invention.
Figure 7:
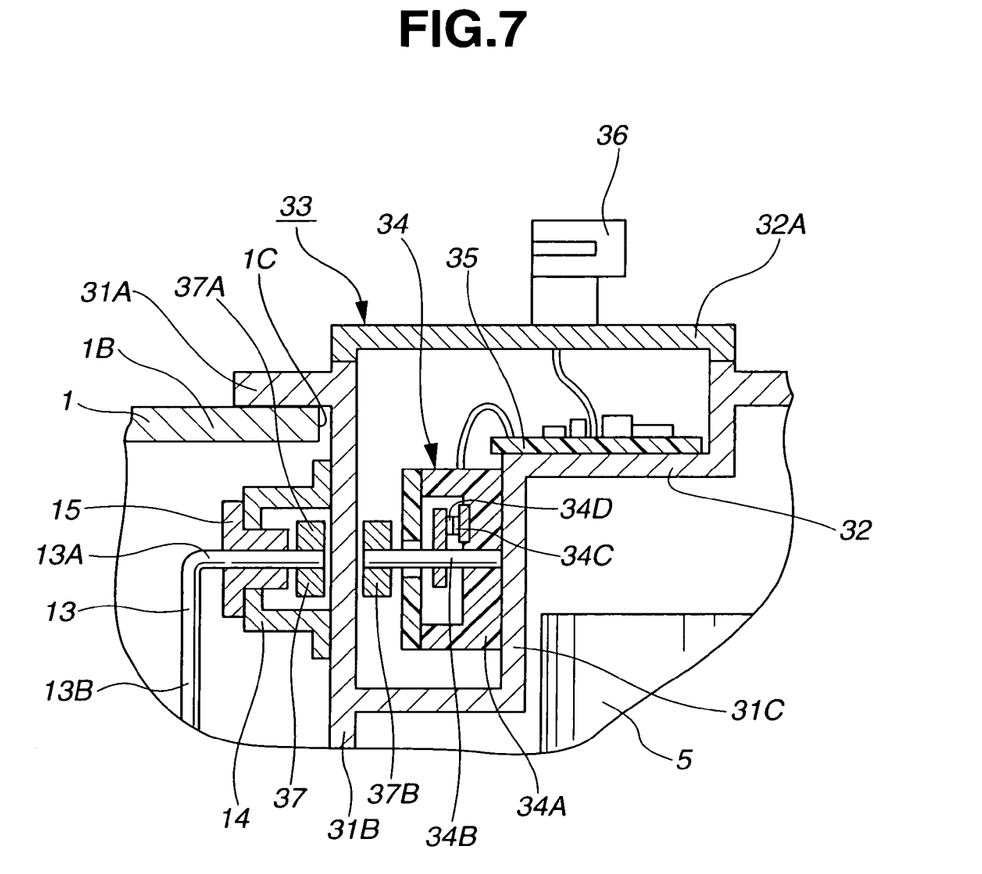
FIG. 7 is a view similar to FIG. 3, showing a sensor casing in FIG. 6.

Referring to FIGS. 6 and 7, there is shown second embodiment of the present invention which is substantially the same as the first embodiment except that the sensor part includes a potentiometer, and a non-contact coupling is arranged between the sensor part and the float.

Specifically, a lid 31 is mounted to mounting opening 1C of fuel tank 1. In the substantially same way as lid 2 in the first embodiment, lid 31 is formed of a resin material or the like which allows passage of the magnetic field, and comprises a closing plate 31A, a chamber mounting portion 31B, an inner partition wall 31C, and the like.

By closing plate 31A, chamber mounting portion 31B, inner peripheral wall 31C, and the like of lid 31, a sensor casing 32 is formed as a closed container. Sensor casing 32 is concealed with a lid plate 32A. Chamber mounting portion 31B has no sensor mounting portion 2D in the first embodiment.

A fuel remaining-amount detecting system 33 is arranged in fuel tank 1 to serve as a level detecting system. Fuel remaining-amount detecting system 33 comprises sensor casing 32, float 12, arm 13, a rotation-angle sensor 34, and a magnet coupling 37 as will be described later.

Rotation-angle sensor or sensor part 34 is accommodated in sensor casing 32 of lid 31. Referring to FIG. 7, rotation-angle sensor 34 is in the form of a potentiometer or the like, and comprises a housing 34A mounted to the inside of sensor casing 34, a rotation shaft 34B rotatably supported by housing 34A, a resistor 34C mounted to housing 34A through a substrate and the like, a conductive slide brush 34D mounted to the outer periphery of rotation shaft 34B through a holder and the like in a rotation locked way, and the like.

Rotation shaft 34B is disposed coaxial with rotation shank 13A of arm 13. Resistor 34C is formed circularly about rotation shaft 34B, and has a circumferential part which slide brush 34D makes slide contact.

When rotation shaft 34B rotates, slide brush 34D moves on resistor 34C in a sliding way in accordance with the angle of rotation of rotation shaft 34B, increasing or decreasing a value of resistance of resistor 34. With this, rotation-angle sensor 34 senses the angle of rotation of rotation shaft 34B coupled to arm 13 through magnet coupling 37 as a variation in value of resistance of resistor 34, which is output as a signal to a circuit board 35 arranged in sensor casing 32.

Circuit board 35 provides signal processing such as amplification and correction to an output signal of rotation-angle sensor 34, for example, to generate a detection signal corresponding to a level position or remaining amount of fuel in fuel tank 1, which is output to the outside from a connector 36 provided to lid plate 32A of sensor casing 32, for example.

Magnet coupling or non-contact coupling 37 is arranged between float 12 (arm 13, to be more specific) and rotation-angle sensor 34 for coupling therebetween through sensor casing 32.

Magnet coupling 37 is disposed outside sensor casing 32, and comprises an annular outer magnet 37A mounted at the outer periphery of the base end of rotation shank 13A of arm 13 in a rotation locked way and an annular inner magnet 37B mounted to the outer periphery of rotation shaft 34B of rotation-angle sensor 34 in a rotation locked way.

Magnets 37A, 37B have N and S poles formed circumferentially alternately, for example, and facing each other across chamber mounting portion 31B of lid 31. When arm 13 rotates, magnets 37A, 37B rotate together with N and S poles coupled magnetically, transmitting rotational displacement of arm 13 to rotation shaft 34B of rotation-angle sensor 34.

Then, the second embodiment can-produce substantially the same effect as that of the first embodiment. In the second embodiment, particularly, magnet coupling 37 is arranged between arm 13 of float 12 and rotation-angle sensor 34, so that even with arm 13 and rotation-angle sensor 34 intercepted by sensor casing 32, magnet coupling 37 allows sure coupling therebetween in a non-contact way, achieving in this state stable detection of the remaining amount of fuel in fuel tank 1.

Rotation-angle sensor 34, circuit board 35, and the like can surely be protected from fuel in fuel tank 1 through the use of sensor casing 32, leading to easy achievement of closed-type fuel remaining-amount detecting system 33. In place of the magnetic-detection type, rotation-angle sensor 34 may include a general-purpose potentiometer or the like, obtaining enhanced design flexibility of the device.

Figure 8:
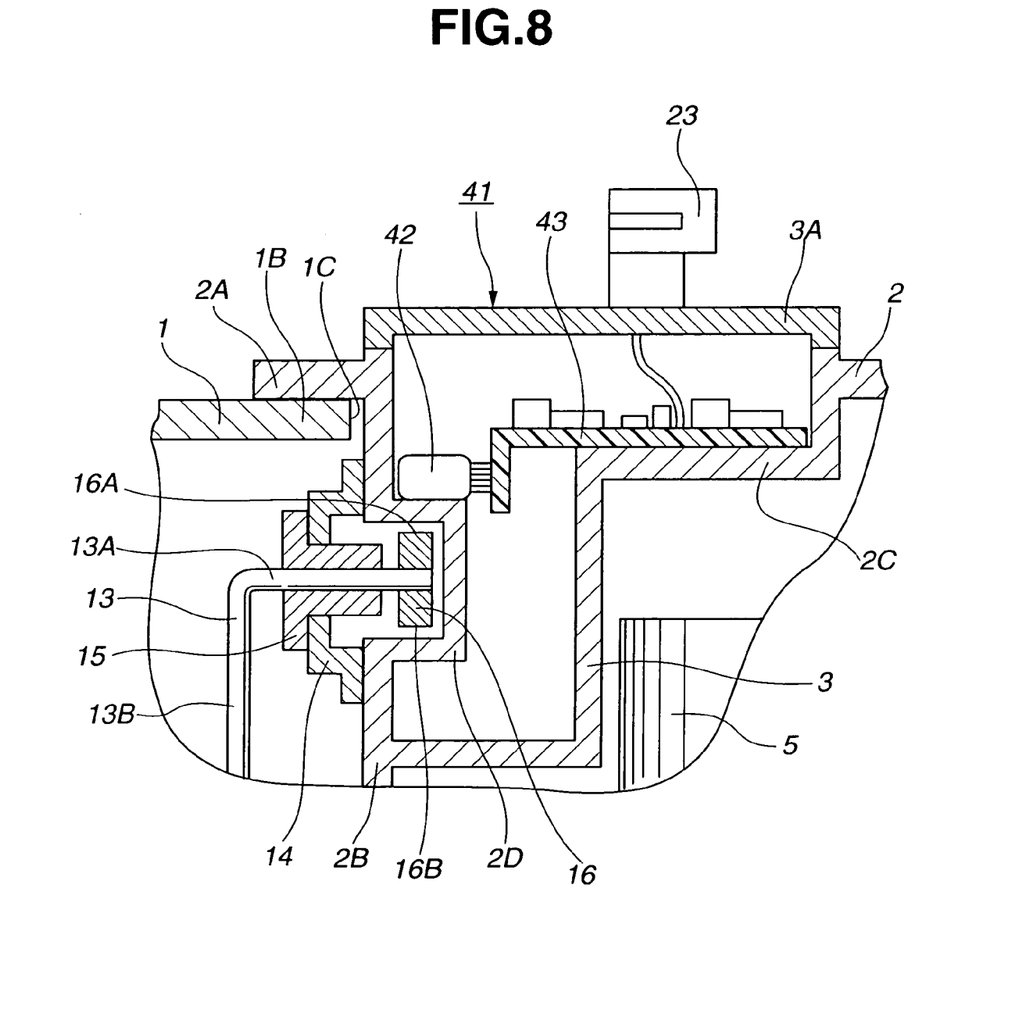
FIG. 8 is a view similar to FIG. 3, showing a third embodiment of the present invention.

Referring to FIG. 8, there is shown third embodiment of the present invention which substantially the same as the first embodiment except that the Hall element is directly mounted on the circuit board.

Specifically, a fuel remaining-amount detecting system 41 is arranged in fuel tank 1 to serve as a level detecting system. Fuel remaining-amount detecting system 41 comprises sensor casing 3, float 12, arm 13, magnet 16, and a Hall IC 42 as will be described later.

Hall IC or sensor part 42 is arranged in sensor casing 3, and comprises an integrated circuit having a Hall element and its peripheral devices packaged, for example. Hall IC 42 is mounted on a circuit board 43 as will be described later. Hall IC 42 is disposed at the outer periphery of sensor mounting portion 2D of lid 2, and faces the N or S pole (convex circular surface 16A, for example) of magnet 16 across sensor mounting portion 2D.

When arm 13 rotates, convex circular surface 16A of magnet 16, for example, approaches or separates from Hall IC 42, so that the magnetic field passing through Hall IC 42 varies with the angle of rotation of arm 13. With this, Hall IC 42 detects a variation in the magnetic field as angle of rotation of arm 13, which is output as a signal to circuit board 43.

Circuit board 43 is mounted to the inside of sensor casing 3, and is bent like a letter L, for example. Circuit board 43 has a surface connected to Hall IC 42. Circuit board 43 provides signal processing such as amplification and correction to an output signal of Hall IC 42, for example, to generate a detection signal corresponding to a level position or remaining amount of fuel in fuel tank 1, which is output to the outside from connector 23.

Then, the third embodiment can produce substantially the same effect as that of the first embodiment. In the third embodiment, particularly, Hall IC 42 is mounted on circuit board 43, allowing simplified structure of the sensor part, resulting not only in a reduction in number of parts and thus manufacturing cost, but also in an enhancement in design flexibility of the device.

Figure 9:
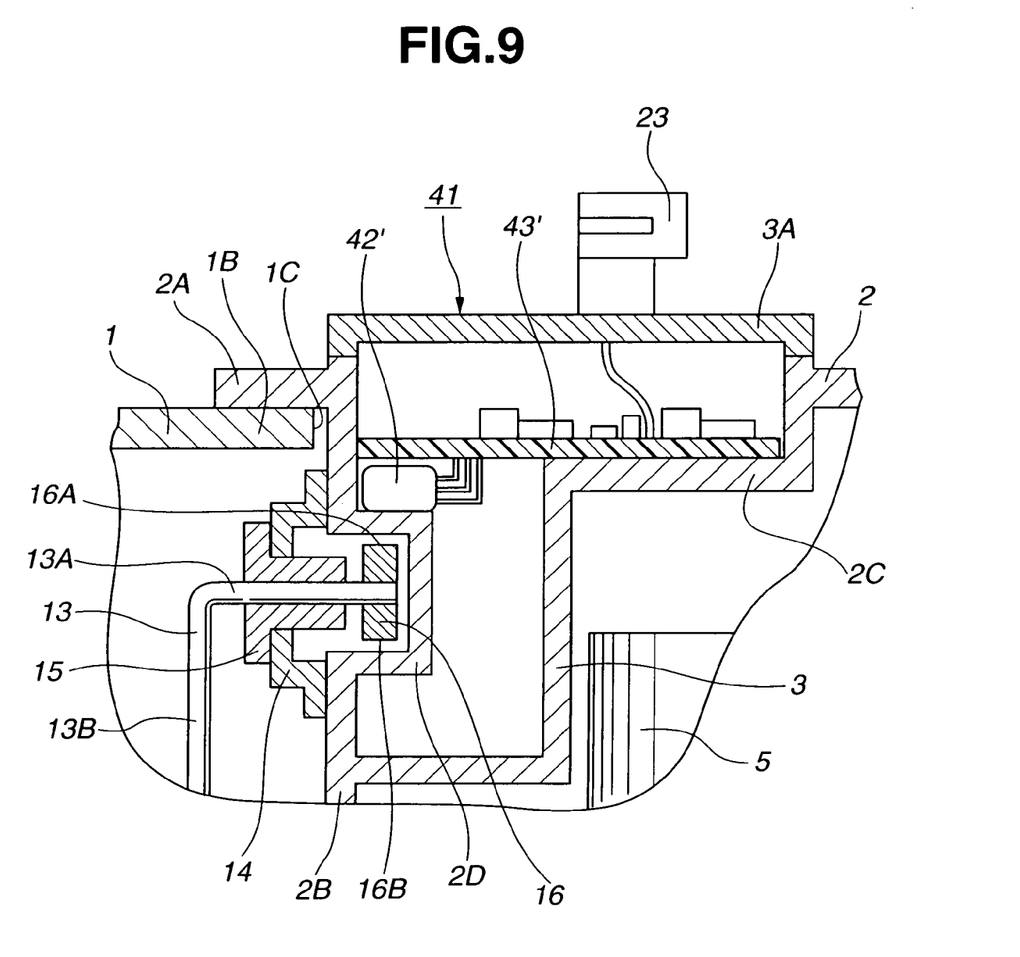
FIG. 9 is a view similar to FIG. 8, showing a first variation of the present invention.

In the third embodiment, Hall IC 42 is disposed at the outer periphery of sensor mounting portion 2D of lid 2, and is mounted on the surface of circuit board 43 bent like a letter L. Optionally, an alternative structure can be adopted as shown in first variation in FIG. 9, wherein a Hall IC 42' is mounted on the underside of a flat circuit board 43'.

Figure 10:
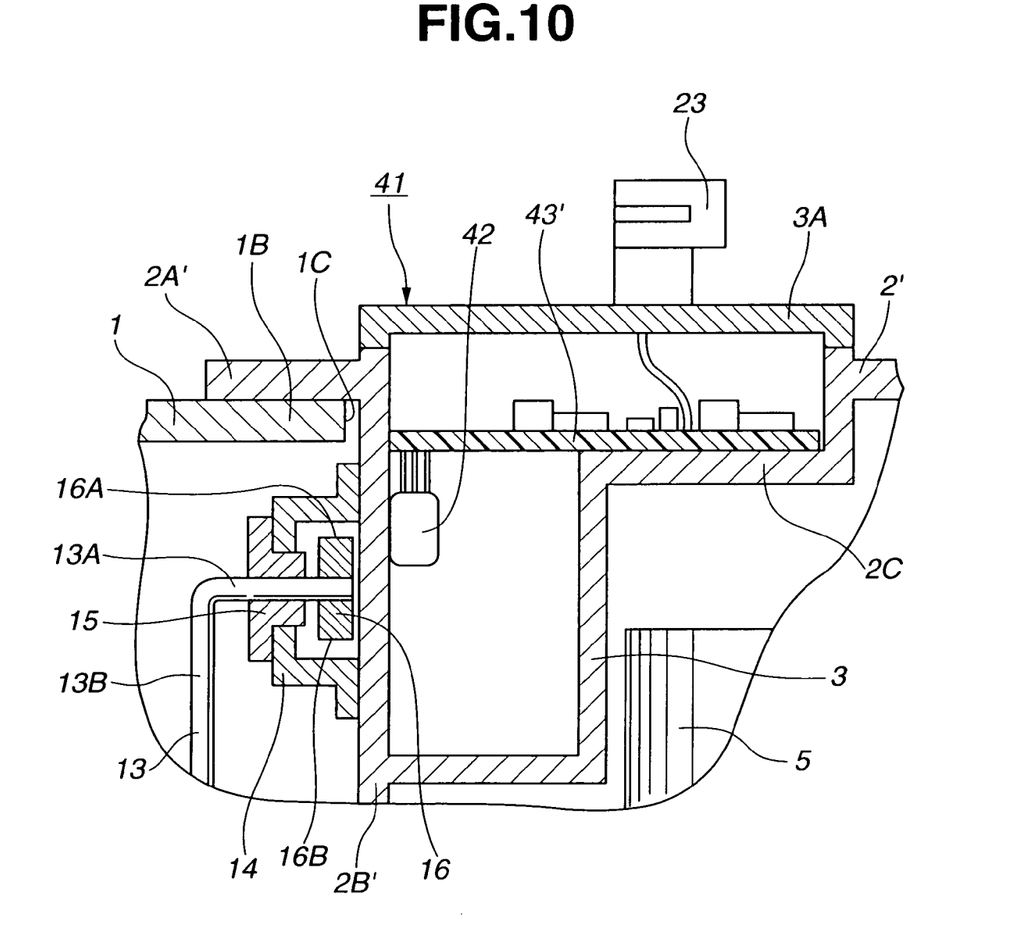
FIG. 10 is a view similar to FIG. 9, showing a second variation of the present invention.

Further, for Hall IC 42, another alternative structure can be adopted as shown in second variation in FIG. 10. In the second variation, in the substantially same way as the third embodiment, a lid 2' comprises a closing plate 2A', a chamber mounting portion 2B', and an inner partition wall 2C' with sensor mounting portion 2D cancelled. Hall IC 42 is mounted on the underside of circuit board 43', and is disposed at the inner periphery of chamber mounting portion 2B' at the position corresponding to convex circular surface 16A of magnet 16, for example.

Furthermore, in the illustrative embodiments, the present invention is applied to an automotive fuel tank. Optionally, the present invention can be applied to various tanks for accumulating liquid other than fuel.

Having described the present invention in connection with the illustrative embodiments, it is noted that various changes and modifications can be made without departing from the scope of the present invention.

The entire contents of Japanese Patent Application P2003-003410 filed Jan. 9, 2003 are incorporated hereby by reference.

What is claimed is:

1. A system for detecting a level of liquid in a tank, comprising:
    a float which produces a displacement with the liquid level;
    a sensor part provided to the tank, the sensor part sensing a position of the liquid level in accordance with the displacement of the float, the sensor part comprising a circuit board and a Hall IC mechanically and electronically coupled to the circuit board for detecting the liquid level; and
    a casing arranged in the tank, the casing being isolated from the liquid, the casing accommodating the sensor part.

2. The system as claimed in claim 1, further comprising a magnet which rotates in accordance with the displacement of the float, wherein the sensor part senses an angle of rotation of the magnet magnetically.

3. The system as claimed in claim 2 wherein the Hall IC and the magnet provide a non-contact coupling which couples the float and the sensor part through the casing in a non-contact way.

4. The system as claimed in claim 1, wherein the Hall IC comprises a housing, yokes, a Hall element, and a circuit board.

5. The system as claimed in claim 4, wherein the Hall IC is mounted on the circuit board.

* * * * *